Sept. 19, 1967 H. T. STIRLING 3,342,467
RECIPROCATING FEEDER AND MOVING GRATE
Filed April 21, 1965 2 Sheets-Sheet 1

FIG. I

INVENTOR.
HAROLD T. STIRLING
BY
Ronald S. Cornell
ATTORNEY

_United States Patent Office_

3,342,467
Patented Sept. 19, 1967

3,342,467
RECIPROCATING FEEDER AND
MOVING GRATE
Harold T. Stirling, 249 Roycroft Ave.,
Pittsburgh, Pa. 15234
Filed Apr. 21, 1965, Ser. No. 449,773
9 Claims. (Cl. 263—6)

The present invention relates to a conveyor for uniformly feeding material to a receiving device and, more particularly, to a feed conveyor adapted to reciprocate across the width of a travelling grate or sinter strand to evenly and uniformly distribute feed material thereto.

One of the major problems involved in the feeding of particles to a moving belt, grate, sinter strand, or the like lies in uniformly distributing the feed particles over the entire width of the receiving means. Various devices have been utilized heretofore in an attempt to solve this problem. For example, swinging spouts and other types of conveyors have been used. These devices, however, have not been entirely satisfactory. The devices which feed the material with some degree of uniformity suffer from other disadvantages. For example, most feeding devices require predrying and preheating apparatus for the feed particles which is independent of the feed conveyor; some feeding mechanisms require large power input in order to both drive the device and also to physically move the device in an attempt to obtain even distribution of feed material on the receiver; still other devices require elongated strips of real estate to enable longitudinal supply of feed material to a moving grate or the like.

It is, therefore, an object of the present invention to provide a novel and improved conveyor capable of uniformly and evenly feeding particles to a receiver.

It is another object of the present invention to provide for the even and uniform feeding of particles to a sinter strand.

It is another object of the present invention to provide a laterally positioned feeding system which is highly effective yet simple and economical to build and to operate.

It is another object of the present invention to provide a feeding conveyor in which a portion only of the conveyor reciprocates to evenly and uniformly feed particles across the width of a moving receiver means for the feed material.

It is another object of the present invention to provide a feed conveyor for use in combination with a sinter strand which permits effective pretreatment of the feed material on the feed conveyor.

Still another object of the invention is to provide a feed conveyor having driving means at the tail end thereof and having a reciprocating discharge end adapted to uniformly discharge feed material across the surface of the apparatus to be fed by the feed conveyor.

In accordance with this invention, there is provided a feed conveyor arranged in a direction normal to the direction of movement of the apparatus being fed. The feed conveyor thus feeds across the width of the travelling grate or pallets on the sinter strand. The conveyor can also feed laterally across the mouth of a stationary furnace. The feed conveyor is provided with a reciprocable head end pulley which moves out at the same or a slightly greater speed than the forward speed of the conveyor belt whereby the conveyor is extended across the width of the sinter strand. It is then retracted in a uniform continuous manner so that the material on the conveyor will be fed onto the sinter strand across the width thereof.

The objects set forth above and others, and the nature and advantages of the present invention will become apparent from the following description and the accompanying drawings; and the novel features will be particularly pointed out hereinafter in connection with the appended claims.

In the drawings, wherein like reference characters are employed to designate like parts:

Figure 1:
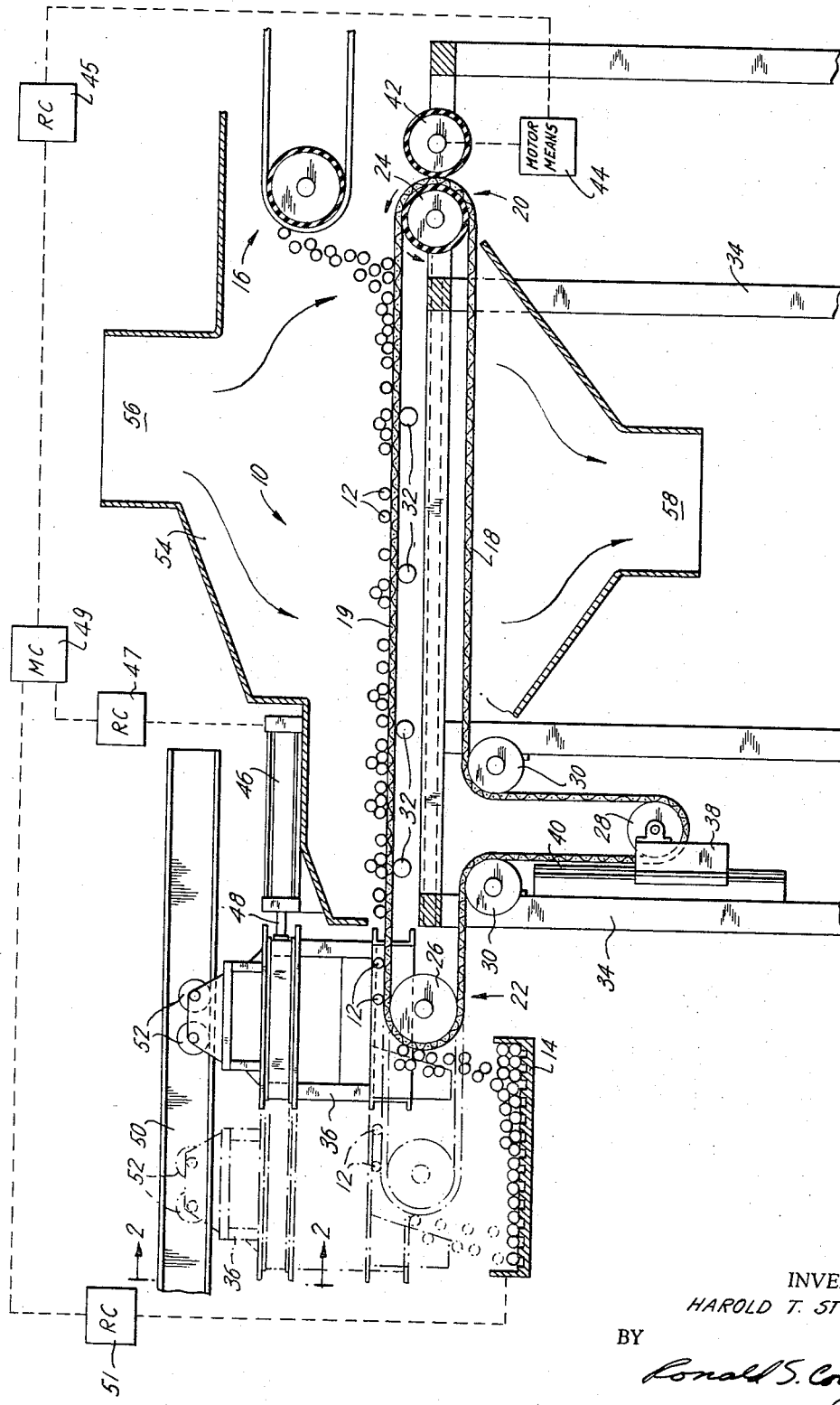
FIGURE 1 is a schematic cross-sectional view of a device in accordance with the present invention.

A feed conveyor shown generally at 10 (FIGURE 1) uniformly and evenly feeds particles 12 such as pelletized iron ore to receiver means which may advantageously be the pallets on a sinter strand or travelling grate 14 on which the particles 12 are to be sintered. A material supply device 16 which may be a conveyor belt, hopper or other suitable device, delivers particles 12 onto the feed conveyor 10 at its tail end 20.

The conveyor 10 comprises an endless belt 18, a head end pulley 26, a tail end pulley 24, and a series of upper-run supporting idler rollers 32. The lower or return run of the endless belt 18 passes over and extends downwardly between a pair of spaced pulleys 30. Positioned in the downwardly extending portion of the lower run of belt 18 is a floating pulley 28 adapted to take up slack upon reciprocation of the head end 22 of conveyor 10 as described more fully hereinafter.

Endless belt 18 receives particles 12 from supply device 16. The particles are received on upper-run 19 adjacent tail end 20 of the conveyor 10 and the particles 12 are delivered to the sinter grate 14 from the head end 22 of conveyor 10. Conveyor 10 is supported by suitable super-structure 34.

Figure 2:
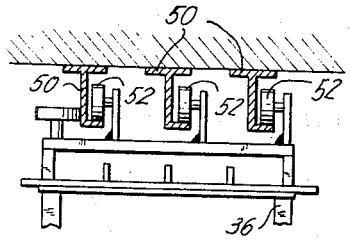
FIGURE 2 is a transverse cross-sectional view taken along line 2—2 of FIGURE 1.

An important feature of the present invention is the manner in which the head end 22 of conveyor 10 feeds the sinter grate 14. The head pulley 26 is supported by a suitable frame 36 from above. Frame 36 is adapted to reciprocate laterally across the width of longitudinally travelling sinter grate 14. The head of feeding end portion 22 of conveyor 10 may be reciprocated by any suitable means such as a pneumatic cylinder 46 having piston 48 which reciprocates the head pulley supporting frame 36. The pneumatic cylinder 46 is preferably controlled automatically by a suitable timing control device 47. The frame 36 is preferably supported for lateral travel on at least two monorails 50 although as shown in FIGURE 2 three such monorails are preferred to impart suitable stability to the device. The frame 36 advantageously rides on wheels 52 on the monorails 50.

Reciprocation of frame 36 carries the feed or head end 22 only to the conveyor 10 causing the head end 22 to reciprocate across the width of sinter grate 14. As the head end 22 reciprocates from the position shown in phantom in FIGURE 1, towards the tail pulley 24, floating pulley 28 moves vertically downwardly to take up the slack in the belt 18 caused by the shortened distance between the head pulley 26 and the tail pulley 24. Although floating pulley 28 may be caused to move downwardly by any suitable means as the head pulley 26 moves towards the tail pulley 24, the simplest and preferred means to cause such downward movement is a gravity actuated counterweight 38 guided by suitable means such as vertical rod 40 or other equivalent guide means.

The conveyor 10 is driven by a rubber covered drive roll 42 which cooperates with the tail pulley 24 and serves to push, rather than pull, the belt 18 during its upper run. The drive roller 42 is driven through suitable linkage by a variable speed motor means 44.

An important feature of the present invention is the provision of suitable control means 45, 47, 49, and 51 to enable the forward movement of the belt 18 to be adjusted to a linear speed no faster than the rate of reciprocation of the head pulley 26 and preferably at exactly the same rate of speed as the reciprocation. This ensures that material 12 is fed to the grate 14 only when the head pulley 26 moves towards the tail pulley 24. As long as the rate of reciprocation is maintained as fast as or faster than the forward speed of travel of the belt 18, the particles will not be discharged onto the sinter grate during the forward stroke of the reciprocation, i.e. as the head pulley 26 moves away from the tail pulley 24. Thus, as the head end 22 is moved forward, the belt 18 also continues its forward movement at the same or a lesser rate of speed. The effective length of the belt is increased by causing floating pulley 28 to rise, thereby allowing the slack in the lower run of the belt to be eliminated.

Figure 3A:
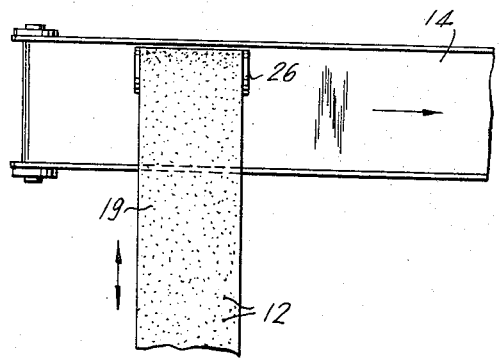
FIGURE 3 is a diagrammatic plan view showing, in parts a, b, and c, a sequence of steps in the operation of the invention.
Figure 3B:
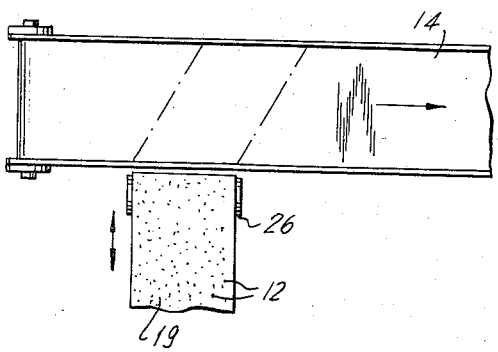
Figure 3C:
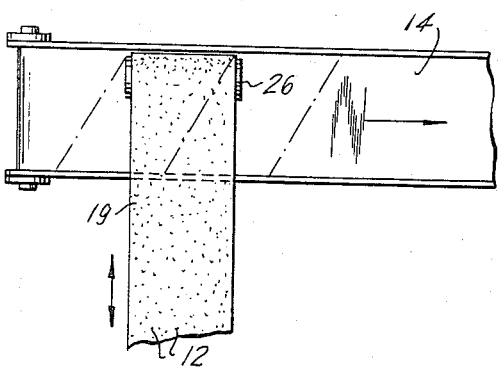

It is further necessary to control the relative forward speed of the receiver belt means and both the reciprocating rates and forward speed of the feeder belt means in relation to the width of said receiver belt means in order to obtain uniform distribution of feed material on the moving receiver means. Thus, for example, if the length of time necessary for forward reciprocation of the feeder belt 19 across the width of the receiving means is $X/2$, and the length of time necessary for retraction of feeder belt is X, and the forward speed of the feeder belt equals the forward speed of the reciprocation of the feeder belt, the width of material on the feeder belt and the forward speed of the strand 14 should be related to allow the feeder belt to place material on the sinter strand in the pattern shown in the drawings. Considering the exemplary speeds set forth above, the feeder belt 19 will perform one complete reciprocation cycle in a period of time that can be described as $3X/2$ whereby the feeder belt 19 will reciprocate from the position shown in FIGURE 3a to that shown in FIGURE 3b in a length of time equal to X thereby depositing material during this period of retraction substantially in the pattern shown. Subsequently, the feed belt 19 will reciprocate in a forward direction in a length of time equal to $X/2$ to the position shown in 3c. No material will be discharged from the feed belt during this portion of the cycle since the speed of forward reciprocation equals the forward speed of the belt. It will, therefore, be clear that assuming a width of feed belt equal to Y, the forward speed of strand 14 must conform to the following formula:

$$S = 2Y/3X$$

where S is the forward speed of the strand, Y is the width of the feed belt and X is as defined above. The above formula is, of course, only applicable where the forward speed of reciprocation is equal to twice the retraction speed of reciprocation of the feeder belt 19. A more generally applicable formula which would encompass the various relations between forward speed of reciprocation and reverse speed thereof would be:

$$S' = \frac{Y'}{X'+Z}$$

wherein S' equals the forward speed of the receiving belt, Y equals the width of the feed belt, X' equals the length of time required for the forward reciprocation of the feed belt across the width of the receiving means and Z equals the length of time required for the reverse reciprocation thereof. Any of the above described variables may be automatically adjusted in accordance with changes in the other variables.

The above described control can be automatically accomplished by use of conventional control systems. One suitable control system, for example, comprises master controller 49 which can be preset manually to the width of the feed belt. The master controller 49 then automatically adjusts the relative forward and reverse speeds of reciprocation and the forward speed of the feeding belt relative to the forward speed of the receiving means by receiving signals from and resetting recorder controllers 47, 45, and 51.

Advantageously, the present invention contemplates the construction of the belt 18 as a foraminous and preferably as a wire mesh structure. This permits effective treatment of the feed material 12 while on feed conveyor 10. Thus, for example, at least a portion of the conveyor 10 may be enclosed or held in housing 54 having a hot air inlet 56 and an outlet 58 spaced across the wire mesh belt 18 so that hot air may be blown therethrough to preheat and predry the particles 12 prior to deposition on the sinter grate 14. In one embodiment of my invention, dirty hot air from the discharge end of the sinter grate may be passed through the inlet 56 thereby conserving energy and reclaiming the fine material while concomitantly cleaning the hot dirty air thereby avoiding air pollution in the general location of the operation.

The feed conveyor may be longitudinally divided into two or more sections by provision of one or more longitudinally extending plates. If it is desired to place two or more layers of different materials on the receiving means, they may be placed on opposite sides of the dividing means, and the automatic control system is set to the width of each section instead of the width of the entire feed belt. In this manner, the rate of reciprocation will be increased and the feeding means can simultaneously feed two or more materials to be set down on top of each other.

It is to be understood that the form of this invention as herein shown and described is only representative of the inventive concepts disclosed and hence various changes may be made without departing from the spirit and scope of the invention as defined in the appended claims.

What is claimed is:

1. A conveyor for feeding material evenly and uniformly transversely to the direction of travel of a receiving device comprising a belt having a feeding end portion adapted to reciprocate laterally across the width of the receiving device, a laterally reciprocating head pulley supporting said feeding end portion of said belt for travel thereabout, a laterally stationary tail pulley for supporting the other end of said belt for travel thereabout, a floating pulley for taking up slack in said belt as said head pulley moves toward said tail pulley, means to reciprocate said head pulley, and a belt driving means which comprises a drive roller positioned on the outer side of said belt at its tail end to cooperate with said tail pulley to drive said belt therebetween.

2. Apparatus in accordance with claim 1 wherein said drive roller is rubber covered to provide positive non-slip movement of said belt.

3. A sintering apparatus comprising in combination an endless strand having a plurality of pallets travelling longitudinally along said strand and means to feed material to be sintered directly to said sinter strand, said feed means comprising a belt conveyor having a laterally stationary tail end and a feeding head end portion adapted to reciprocate laterally across the width of said longitudinally travelling sinter strand to evenly and uniformly feed material directly thereto, means to drive said belt, and means to reciprocate said head end portion at a rate related to the widths of said endless strand and said belt conveyor and to the forward speeds thereof in accordance with the formula:

$$S = \frac{Y}{X+Z}$$

wherein:

S equals the forward speed of the receiving belt;
Y equals the width of the feeding belt;

X equals the length of time required for forward reciprocation of the feed belt across the width of the receiving means; and Z equals the length of time required for the reverse reciprocation thereof.

4. Apparatus in accordance with claim 3 wherein said reciprocating means moves said head end portion at least as fast as said belt driving means moves said belt whereby no material is fed to said sinter strand while said head end portion moves away from said tail pulley and said head end portion is extended across the said endless strand more rapidly than the rate at which it is retracted.

5. A sintering apparatus comprising in combination an endless moving sinter strand, means for feeding material directly and uniformly transversely to the direction of travel of said strand said means comprising a foraminous belt having a feeding end portion adapted to reciprocate laterally across the width of said strand to directly and uniformly feed material thereto, a laterally reciprocating head pulley supporting said feeding end portion of said belt for travel thereabout, a rotatable tail pulley for supporting the other end of said belt for travel thereabout, means to drive said belt, means to reciprocate said head pulley laterally across said receiving device, means for taking up slack in said belt as said head pulley is retracted, and means for pre-heating and drying material on said feed means including a housing about said belt conveyor, hot air inlet means to said housing, air outlet means from said housing spaced across said belt from said inlet, and conduit means adapted to carry hot air from the discharge end of said sinter strand to said housing inlet.

6. Apparatus in accordance with claim 5 wherein said foraminous belt is formed of wire mesh.

7. Apparatus for feeding material evenly and uniformly transversely to the direction of travel of a moving receiving device comprising means to drive said belt about said feeding end and tail pulleys, and means to control said means to reciprocate and said means to drive said belt comprising, automatic control means adapted to adjust the forward speed and rate of reciprocation of the feeding means relative to each other and to the forward speed of the receiving means in accordance with the formula:

$$S = \frac{Y}{X+Z}$$

wherein:

S equals the forward speed of the receiving belt;
Y equals the width of the feeding belt;
X equals the length of time required for forward reciprocation of the feed belt across the width of the receiving means; and
Z equals the length of time required for the reverse reciprocation thereof.

8. Apparatus for feeding material directly to a receiving means to place a continuous and uniform layer of material thereon comprising in combination, a moving receiving means, an endless feed belt conveyor having a feeding end portion adapted to reciprocate across said moving receiving means in a direction lateral to the direction of movement of said receiving means, means for depositing material onto said feed belt conveyor at a point removed from the feeding end portion thereof, a reciprocable and rotatable feeding end pulley supporting said feeding end portion of said belt for travel thereabout, a rotatable tail pulley for supporting the other end of said feed belt conveyor for travel thereabout, means to maintain the upper strand of said belt taut, means to drive said belt about said feeding end and tail pulleys, and means to reciprocate and retract said feeding end pulley across said receiving means at a rate related to the width of the feed belt conveyor, the width of the moving receiving means, and the rates of forward movement of said feed belt conveyor and said receiving means whereby to place a continuous and uniform layer of material directly onto said receiving means, said material being placed on said receiving means only when said feeding end is retracted and the distance between the means for depositing material onto said feed belt conveyor and said feeding end portion thereof is shortened.

9. A sintering apparatus comprising in combination an endless strand having a plurality of pallets travelling longitudinally along said strand and means to feed material to be sintered directly to said sinter strand, said feed means comprising a foraminous belt conveyor having a tail end and a feeding head end portion adapted to reciprocate laterally across the width of said longitudinally travelling sinter strand to evenly and uniformly feed material directly thereto, means to drive said belt, means to reciprocate said head end portion and means for pre-heating and drying material on said feed means including a housing about said belt conveyor, hot air inlet means to said housing, air outlet means from said housing spaced on the side of said belt opposite said inlet, and conduit means adapted to carry hot air from said sinter strand to said housing inlet.

References Cited

UNITED STATES PATENTS

| 887,242 | 5/1908 | Frank | 198—139 |
| 2,797,075 | 6/1957 | Wilbur | 263—8 |
| 2,863,553 | 12/1958 | Nordquist | 198—139 |
| 3,184,038 | 5/1965 | Greaves et al. | 266—21 |

FREDERICK L. MATTESON, Jr., *Primary Examiner.*

JOHN J. CAMBY, *Examiner.*